United States Patent
Modi et al.

(10) Patent No.: US 9,332,616 B1
(45) Date of Patent: May 3, 2016

(54) PATH LIGHT FEEDBACK COMPENSATION

(71) Applicant: Google Inc., Mountain View, CA (US)

(72) Inventors: Yash Modi, San Mateo, CA (US); Anthony Michael Fadell, Woodside, CA (US); Mark Rajan Malhotra, San Mateo, CA (US); Shao-Po Ma, Mountain View, CA (US)

(73) Assignee: GOOGLE INC., Mountain View, CA (US)

( * ) Notice: Subject to any disclaimer, the term of this patent is extended or adjusted under 35 U.S.C. 154(b) by 0 days.

(21) Appl. No.: 14/585,225

(22) Filed: Dec. 30, 2014

(51) Int. Cl.
H05B 37/02 (2006.01)
G01J 1/44 (2006.01)

(52) U.S. Cl.
CPC ............... *H05B 37/0218* (2013.01); *G01J 1/44* (2013.01); *H05B 37/0227* (2013.01); *G01J 2001/444* (2013.01)

(58) Field of Classification Search
CPC ................... H05B 37/0218; H05B 37/0227
USPC .......................................... 315/151, 152, 291
See application file for complete search history.

(56) References Cited

U.S. PATENT DOCUMENTS

| 4,701,669 | A | 10/1987 | Head et al. |
| 6,219,140 | B1 | 4/2001 | Kaplan |
| 6,263,260 | B1 | 7/2001 | Bodmer et al. |
| 6,415,295 | B1 | 7/2002 | Feinberg |
| 6,880,957 | B2 | 4/2005 | Walters |
| 7,608,815 | B2 | 10/2009 | Sharma et al. |
| 8,510,255 | B2 | 8/2013 | Fadell et al. |
| 8,848,202 | B2 | 9/2014 | Dyer et al. |
| 9,129,548 | B2 * | 9/2015 | Zheng .................... G09G 5/10 |

| 2004/0030531 | A1 | 2/2004 | Miller et al. |
| 2010/0289644 | A1 | 11/2010 | Slavin et al. |
| 2011/0046805 | A1 | 2/2011 | Bedros et al. |
| 2011/0221350 | A1* | 9/2011 | Staab ............... H05B 37/0218 315/154 |
| 2011/0304541 | A1* | 12/2011 | Dalal .................... G06F 3/017 345/158 |
| 2012/0186774 | A1 | 7/2012 | Matsuoka et al. |
| 2013/0049610 | A1* | 2/2013 | Chen .................... G08B 15/00 315/159 |
| 2013/0163619 | A1 | 6/2013 | Stephanson et al. |
| 2014/0062466 | A1 | 3/2014 | Thibault et al. |
| 2014/0132578 | A1 | 5/2014 | Zheng |
| 2014/0263977 | A1* | 9/2014 | Jones .................... G01J 1/4204 250/214 AL |

(Continued)

FOREIGN PATENT DOCUMENTS

| DE | 102005018826 B3 | 10/2006 |
| EP | 1912180 A2 | 4/2008 |
| WO | 2011141056 A1 | 11/2011 |

OTHER PUBLICATIONS

International Search Report and Written Opinion dated Feb. 12, 2016 issued in International Application No. PCT/US2015/061157.
Deng, et al., "The Design of Burglar Alarm Circuit Based on the Magnetic Field Sensor", Computing, Measurement, Control and Sensor Network (CMCSN), 2012 International Conference on, IEEE, Jul. 7, 2012, pp. 199-200.

*Primary Examiner* — Don Le
(74) *Attorney, Agent, or Firm* — Morris & Kamlay LLP

(57) ABSTRACT

A path light that utilizes an ambient light sensor to determine the lighting conditions may experience feedback from its light source if it determines that the lighting conditions are appropriate to illuminate the path light's light source. The path light, as disclosed herein, may compute an offset value to ascertain the amount of feedback from the light source. Upon learning the offset value, the path light may subtract the offset value from a detected amount of light to determine whether the lighting conditions of its surroundings still meet a threshold level of darkness for the path light to illuminate.

25 Claims, 13 Drawing Sheets

(56) References Cited

U.S. PATENT DOCUMENTS

| | | |
|---|---|---|
| 2014/0266669 A1 | 9/2014 | Fadell et al. |
| 2014/0313032 A1 | 10/2014 | Sager et al. |
| 2015/0223309 A1* | 8/2015 | Mohan ................ G01S 5/0027 315/153 |

* cited by examiner

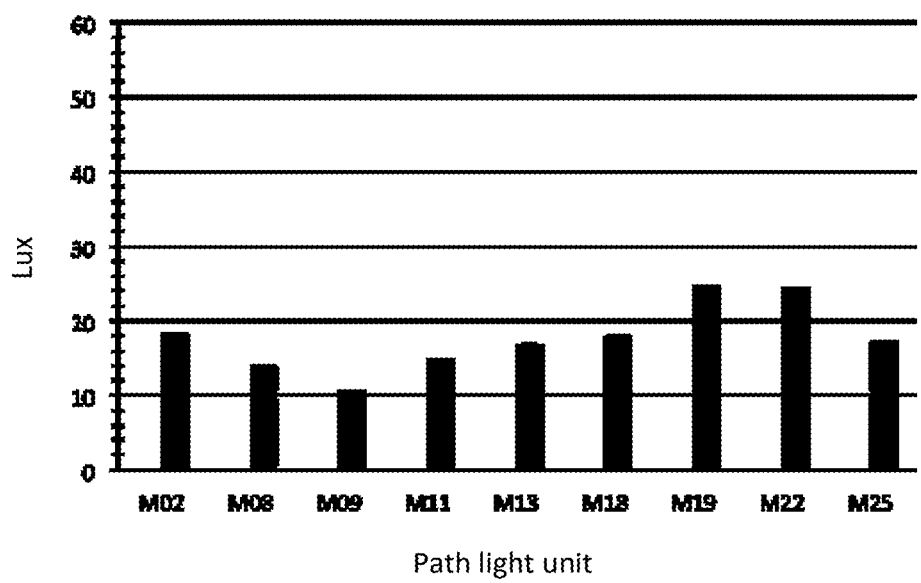
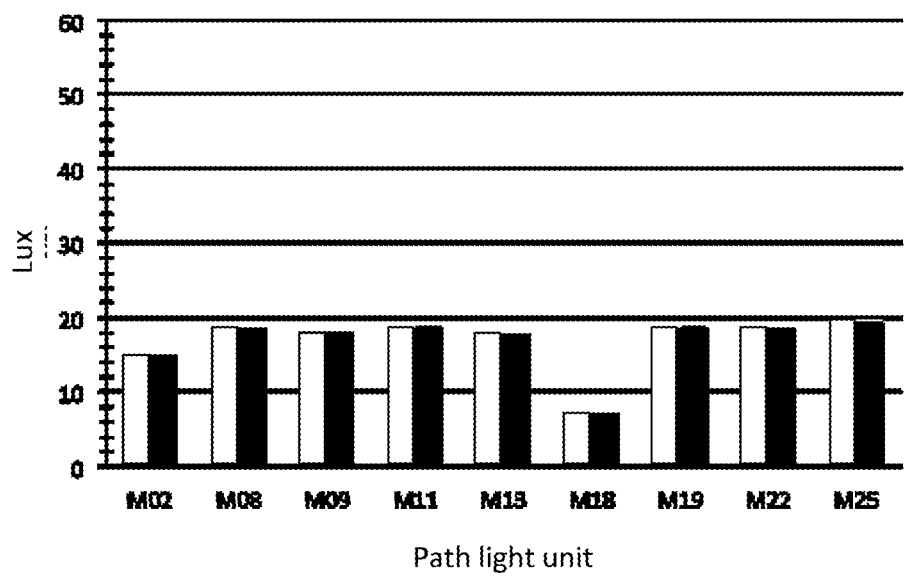

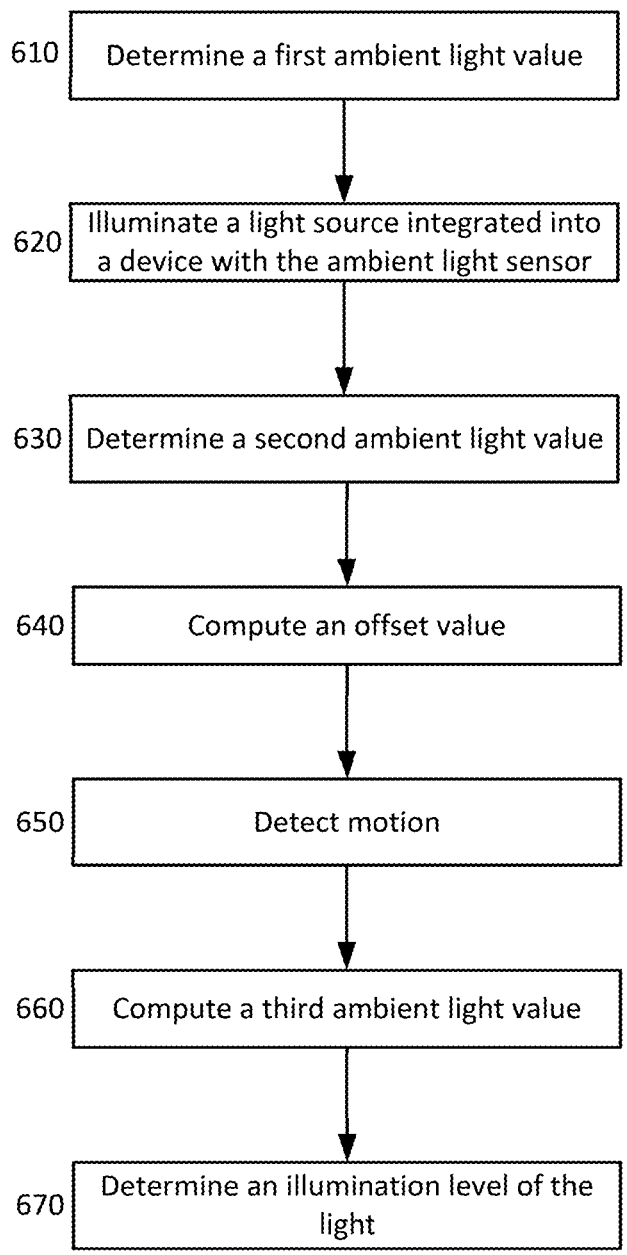

PATH LIGHT FEEDBACK COMPENSATION

CROSS-REFERENCE TO RELATED APPLICATIONS

This application is related to U.S. application Ser. No. 14/585,226, the contents of which are hereby incorporated by reference in their entirety.

BACKGROUND

A path light may refer to a light source that illuminates a pathway. By comparison, a room light, for example, may illuminate an entire room including a pathway. Path lights are typically utilized to illuminate a sidewalk or path on the exterior of a home, or a particular path on the interior of the home, such as a hallway. In a commercial setting, such as a movie theater, a path light may be utilized to illuminate stairways to direct consumers to an exit. A path light may have an ambient light sensor attached to it such that it illuminates only in dark conditions. However, the light emitted by the path light may prevent the light from operating as desired.

BRIEF SUMMARY

According to an implementation of the disclosed subject matter, a first ambient light value may be determined based on a first amount of light detected by an ambient light sensor. A light source integrated into the ambient light sensor may be illuminated. A second ambient light value may be determined based on a second amount of light detected by the ambient light sensor when the light source is illuminated at an intensity. An offset value may be computed. The offset value may represent the difference between the first ambient light value and the second ambient light value. Motion may be detected, for example, by a motion detector associated with the path light. A third ambient light value may be computed based on a third amount of light detected by the ambient light sensor and the offset value. An illumination level for the light source may be determined based on the third ambient light value and the detected motion.

A path light device is disclosed that includes an ambient light sensor, a light source, and a processor. The processor may send data generated by the light sensor to a controller and/or remote system. The device may further include a power source and/or a radio transceiver through which it may send data to and/or receive data from the controller and/or remote system. The processor, whether incorporated in the device or as a component of a controller and/or remote system, may be configured to perform one or more of the following processes. The processor may be communicatively coupled to the ambient light sensor and/or the light source. The processor may be configured to determine a first ambient light value based on a first amount of light detected by the ambient light sensor. The processor may be configured to illuminate the light source and determine a second ambient light value based on a second amount of light detected by the ambient light sensor when the light source is illuminated at an intensity. The processor may be configured to compute an offset value representing the difference between the first ambient light value and the second ambient light value. The processor may be configured to detect motion and/or receive an indication that motion has been detected. The processor may be configured to compute a third ambient light value based on a third amount of light detected by the ambient light sensor and the offset value. The processor may be configured to determine an illumination level of the light source based on the third ambient light value and the detected motion.

In an implementation, a system according to the presently disclosed subject matter may include a means for determining a first ambient light value based on a first amount of light detected by an ambient light sensor. The system may include a means for illuminating a light source that is integrated into the ambient light sensor and determining a second ambient light value based on a second amount of light detected by the ambient light sensor when the light is illuminated at an intensity. The system may include a means for computing an offset value representing the difference between the first ambient light value and the second ambient light value. The system may include a means for detecting motion. The system may include a means for computing a third ambient light value based on a third amount of light detected by the ambient light sensor and the offset value. The system may include a means for determining an illumination level of the light based on the third ambient light and the detected motion.

According to an implementation, an offset value for a path light may be obtained. The offset value may correspond to the difference between a first amount of light detected by an ambient light sensor of the path light when a light source of the path light is illuminated at an intensity and a second amount of light detected by the ambient light sensor when the light source is inactive. The path light may receive an activation signal and the path light may be activated at the intensity. A third amount of light may be detected by the ambient light sensor. The offset value may be subtracted from the third amount to produce an adjusted light level. The adjusted light level may be determined to be below a threshold. In response to the determination the adjusted light level is below the threshold, the light may be illuminated at the intensity.

In an implementation, a first offset value for a path light may be determined. The first offset value may correspond to the difference between a first amount of light detected by an ambient light sensor of the path light when a light source of the path light is illuminated at an intensity and a second amount of light detected by the ambient light sensor when the light source is inactive. A first environmental light amount may be determined by the ambient light sensor. The first offset value may be applied to the environmental light amount. A re-test signal may be received. Responsive to the re-test signal, a second offset value for the path light may be determined that corresponds to the difference between a third amount of light detected by an ambient light sensor of the path light when a light source of the path light is illuminated at an intensity and a fourth amount of light detected by the ambient light sensor when the light source is inactive. A second environmental lighting amount may be determined by the light sensor. The second offset value may be applied to the second environmental light amount.

Additional features, advantages, and implementations of the disclosed subject matter may be set forth or apparent from consideration of the following detailed description, drawings, and claims. Moreover, it is to be understood that both the foregoing summary and the following detailed description provide examples of implementations and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

FIG. 5A is an example of a dark room (e.g., 0 lx) in which the light source is off (white bars) or on (black bars) as disclosed herein.

FIG. 5B is an example of a dimly lit (e.g., 150 lx) room in which the light source for nine path lights was turned on (black bars) or off (white bars) and the illuminance was measured as disclosed herein.

FIG. 6 is an example process for determining an offset value for the path light as according to an implementation.

DETAILED DESCRIPTION

A path light, as disclosed herein, may illuminate in response to motion being detected and/or in response to a certain level of darkness in the environment in which the path light is located. One or more path lights may operate independently and/or as part of a smart home system that includes a controller and/or remote system as described in detail below. Each path light may include an ambient light sensor and a light source. When a path light illuminates in response to the amount of light in its proximate environment and/or motion being detected, the light emitted by the path light may be detected by the ambient light sensor, which may cause the path light to incorrectly determine that the ambient environment is brighter than it would be in the absence of the path light being illuminated. If not corrected, this may cause undesirable or anomalous operation of the path light. Devices and techniques disclosed herein address this possibility by compensating for the light emitted by the light source in the path light.

Figure 1:
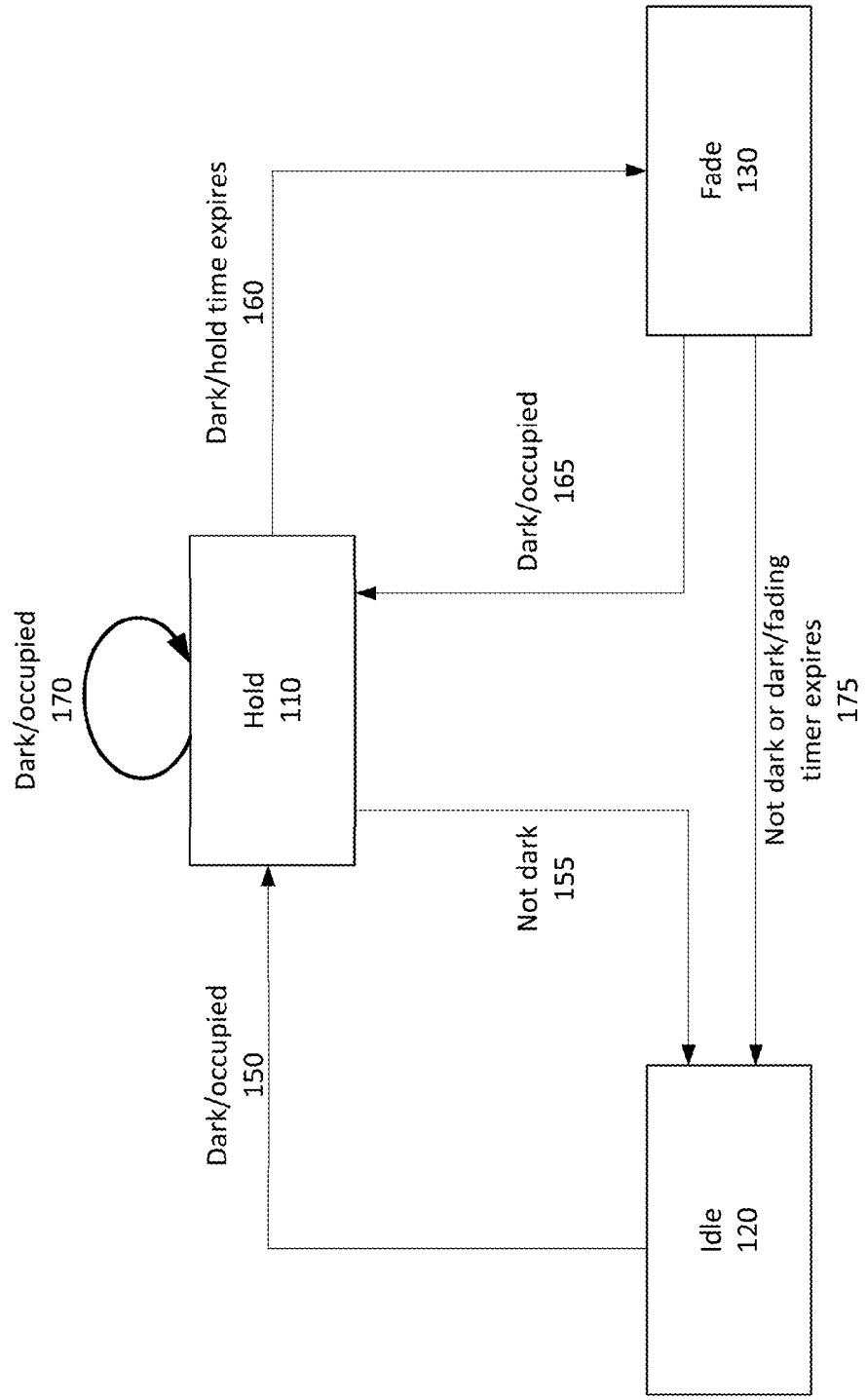
FIG. 1 shows an example of the logic guiding the activation of a path light as disclosed herein.

FIG. 1 shows an example of the logic guiding the activation of a path light that includes an ambient light sensor and a light source. Other examples of path light logic may be utilized with implementations disclosed herein. Three states are illustrated. Beginning at the idle state 120, an ambient light sensor connected to the path light's light source (e.g., a LED) may detect an amount of light in the proximate environment of the light sensor. An indication that the environment of the path light is occupied (e.g., by a person) also may be received. For example, a motion sensor, thermal imaging sensor, camera, or the like may detect the presence of a person near the path light or about to enter the field of view of the path light. The field of view of the path light may refer to a space that is less than 1 m outward from an individual path light, a space that can be observed by a motion sensor integrated into the path light, and/or a signal received from an adjacent path light and/or controller (described below) indicating the presence of a person (see, for example, FIGS. 3B and 3C and description thereof below). The motion sensor or similar sensor may communicate data obtained by the sensor and/or an indication of movement in the environment of the path light to a controller and/or remote system associated with the smart home. The controller and/or remote system may communicate the detected motion to the path light. In some configurations, the indication of motion or occupancy may be communicated directly to the path light. In some configurations, a motion sensor (e.g., a passive infrared sensor) or similar sensor may be integrated into the path light itself (e.g., a part of a single device that contains the light sensor, the light source, and the motion sensor). A motion sensor, or other sensor, may determine "occupancy" of an area. For example, if a user has placed a path light in a hall way and a motion sensor integrated into the path light observes motion, the path light may be deemed "occupied." Upon determining that the amount of light in the path light's environment is below a threshold level of ambient light (e.g., that it is dark) and occupied at 150, the path light may be placed into a hold state 110 in which the light source of the path light is illuminated at a constant intensity as shown in the example provided in FIG. 2 at 220.

Figure 2:
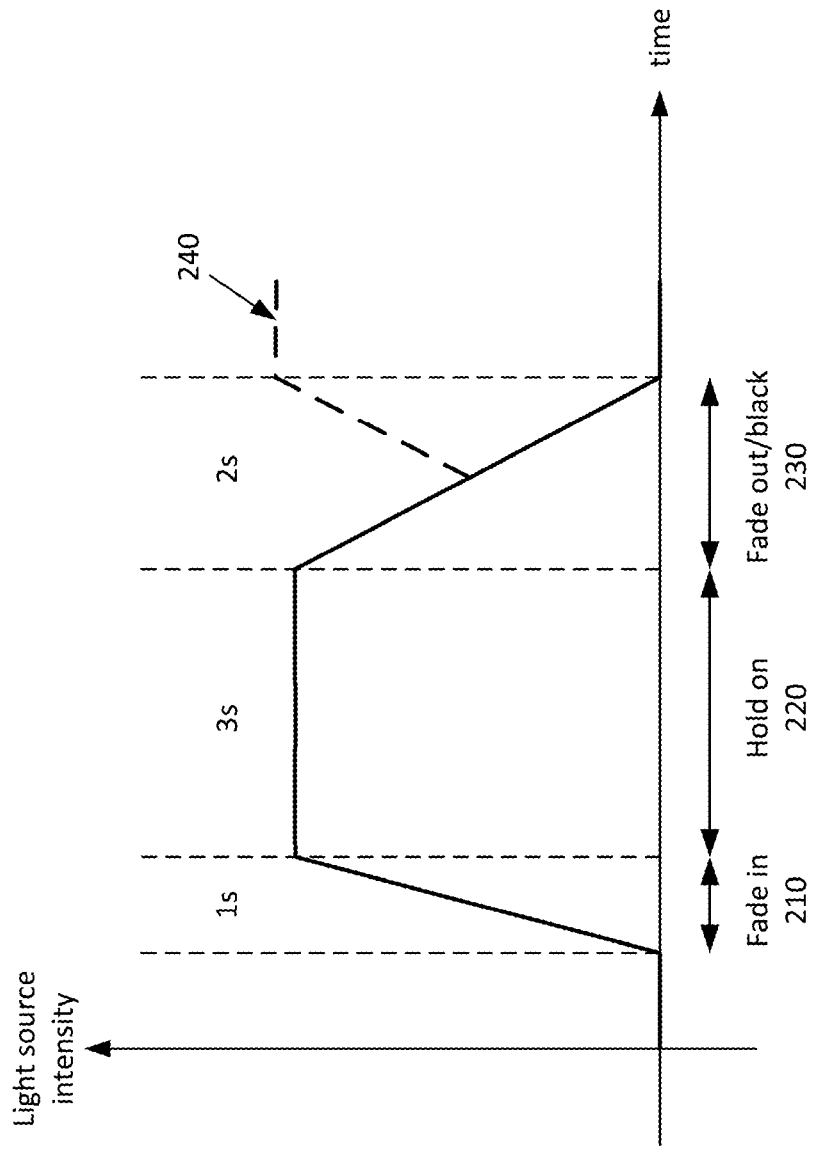
FIG. 2 is an example of the light source intensity as a function of time for a path light as disclosed herein.

FIG. 2 is an example of the light source intensity as a function of time for a path light. At 210, the path light's light source may "fade in" to a fully-illuminated state over a predetermined period of time 210, such as one second. The behavior of the light source in various conditions, such as fade in duration, fade out duration, and/or the maximum intensity of the light source, may be configured by a user and/or a manufacturer of the path light. While in the hold state 110, the path light may determine at 170 whether the ambient light level is still at the threshold amount and whether the path light's environment is occupied. The light source may remain at a high or fully illuminated state 220 for a period of time such as three seconds. While in the hold state 110, the level of illumination of the light source may remain constant. In the event that the hold state timer expires and the measured ambient light level is still below the threshold, i.e., it is still "dark" at 160, the light source may begin to fade out at 130. For example, FIG. 2 shows a configuration in which the light source fades out over a two-second period at 230.

At the fade state 130, the light source may begin to decrease in intensity. Once the fading timer expires, the light source for the path light may turn off at 175. If while fading out, the ambient light sensor indicates that the room is no longer dark, then the light source may be turned off irrespective of the fading timer's status at 175. For example, a path light may be utilized in a hallway. A user may turn on a hallway light. In such a case, the path light is no longer needed to illuminate a pathway. If while fading out, however, the path light's environment is still dark and it is determined that the path light's environment is occupied at 165, the path light may return to the hold state 110. The light's intensity may increase, for example, as shown at 240 in the example shown in FIG. 2, and the hold timer may be restarted at 170. At 155, if the path light's location is no longer dark at 155, then it may return to the idle state 120. The presence of light above a threshold level (e.g., not dark) may interrupt the hold timer before it has expired. That is, the light source of the path light may be turned off if it is determined that the ambient light level is above a threshold, as previously described.

The path light may illuminate based on a condition other than or in addition to the amount of light detected and/or occupancy. For example, if a smoke alarm connected to a smart home system indicates the presence of smoke in the home or a portion of the home, the path light default logic may be overridden to illuminate the path light irrespective of the amount of light detected. Other user-specified preferences may override the default behavior of a path light, such as the intensity of the ambient light, the timing of the transitions between the states shown in FIG. 1, pattern of illumination, color of illumination, etc.

An environment may be considered a dark environment if it is below a threshold level of ambient light. For example, in many applications, an illuminance of 60 lx or less may be considered a dark environment. However, the threshold level of ambient light may be adjusted depending on the particular environment and/or application of the path light to provide appropriate illumination in response to a particular level of environmental light. Illuminance may measure the intensity of light across a surface such as the amount of light detected by an ambient light sensor of a path light as disclosed herein. Other measures such as light intensity (lumens) and/or candela may be computed from lux using readily available techniques. For example, a dark environment may be described in terms of lumens and/or candela with respect to a distance, light source, and/or environment. A threshold level of light may be established in terms of any measure of light including lumen, candela, etc.

An example of a path light device 301, as disclosed herein, is provided in FIG. 3. The path light may include a power source such as a battery 399 or a plug that is compatible with a standard home electrical outlet. In some exterior applications, for example, the power source may be wired into the device through an underground or in-ground system. The path light 301 may include a processor 310 and a computer-readable memory 320, such as a read-only memory. The processor 310 may perform actions based on sensor data, instructions received from the controller and/or a remote system 305, instructions or data stored in the memory 320, or combinations thereof. The memory 320 may contain instructions for the processor's 310 operation. The transceiver 330 may be omitted in some configurations. As depicted in FIG. 3, it may represent a radio, a USB communication channel, etc. The transceiver 330 may connect the path light 301 to a wireless network and send/receive data via the network. The path light 301 may communicate to one or more other path light devices 302 over the network via the transceiver 330. For example, the path lights may coordinate their activities such that if one path light 301 detects motion and it is dark, it may signal the detected motion to other path lights 302 and all of the path lights 301, 302 in the defined area may illuminate.

The path light may include a light source 340 such as a LED. The intensity of the light source may be controlled by the processor 310. The intensity of the light source 340 may cause the surrounding area to have an illuminance between 125 lux and 550 lux. For example, the light source 340 may have a fully activated mode in which it illuminates a surface 0.5 m away at 500 lux. The light source 340, therefore, may have intensities that that change depending on the amount of light detected by the ambient light sensor 350. For example, when in the hold state shown in FIG. 1, an LED of the path light may illuminate at 200 lx. If it transitions to the fade state, it may reduce its intensity to 150 lx, 125 lx, and off for every second after the hold timer expires in accordance with the fade timer, as described above.

Figure 3A:
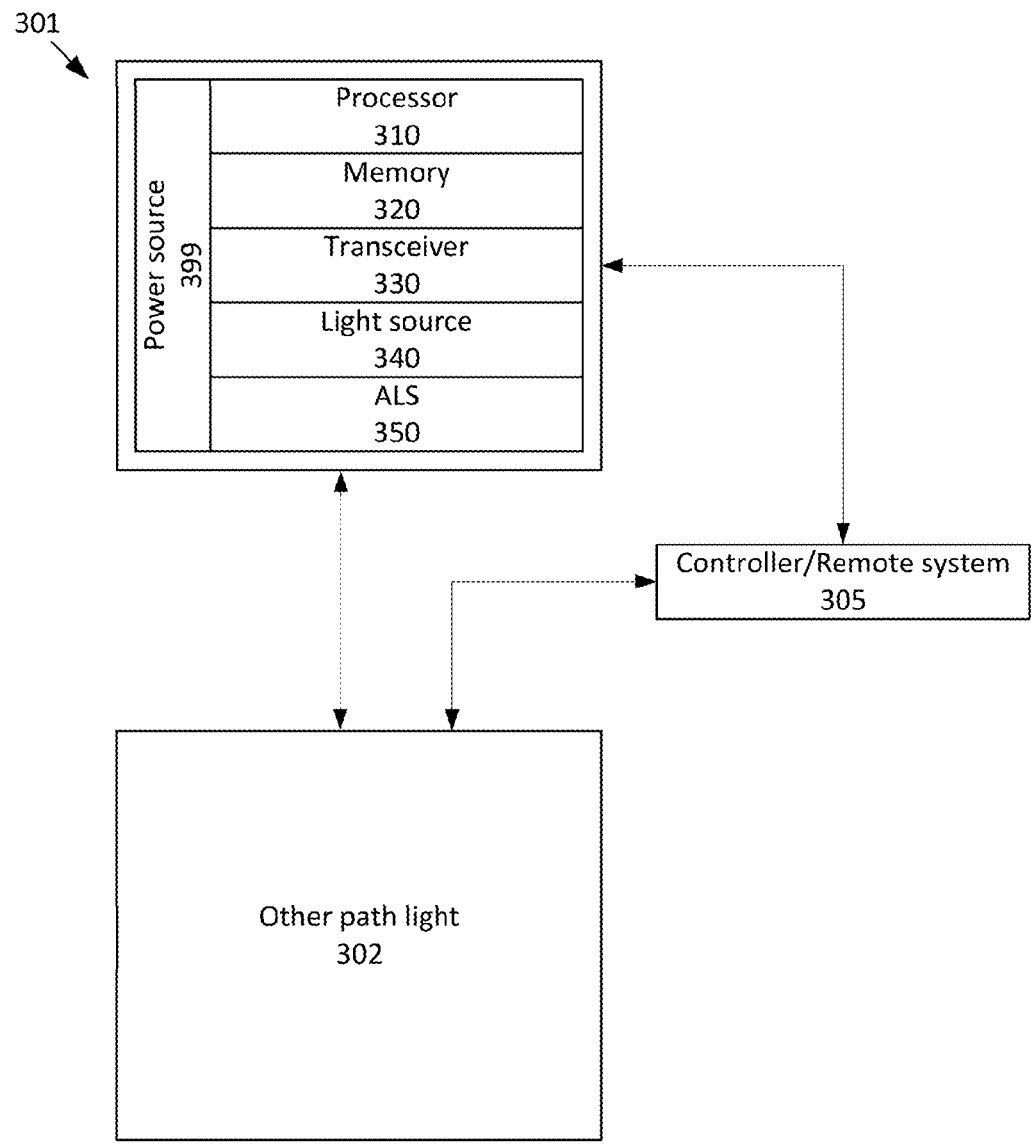
FIG. 3A is an example hardware configuration for a path light as disclosed herein.
Figure 3B:
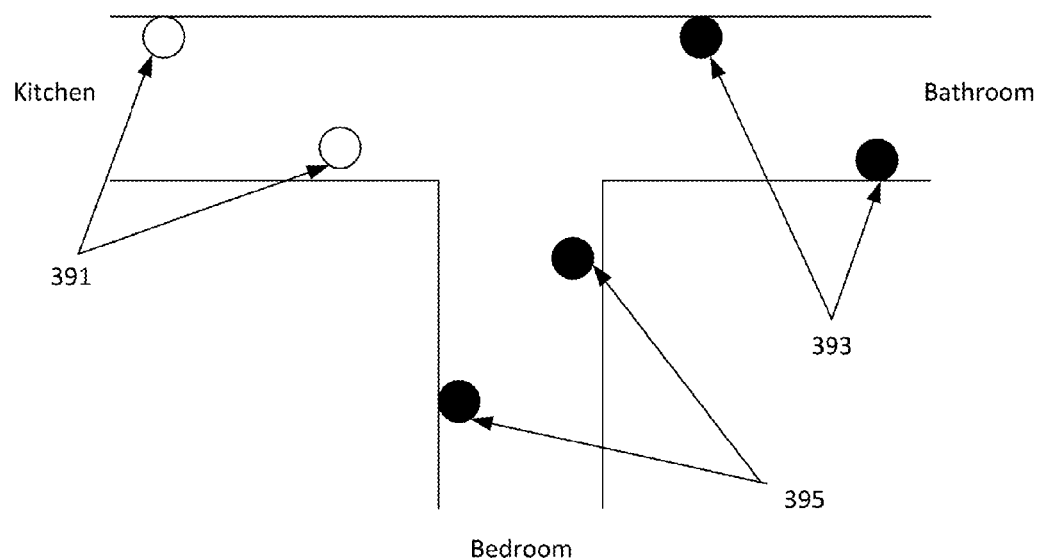
FIG. 3B is an example configuration of a hallway with a first and second group of path lights, of which only the first group is active, that can adapt to a learned pattern of behavior as disclosed herein.
Figure 3C:
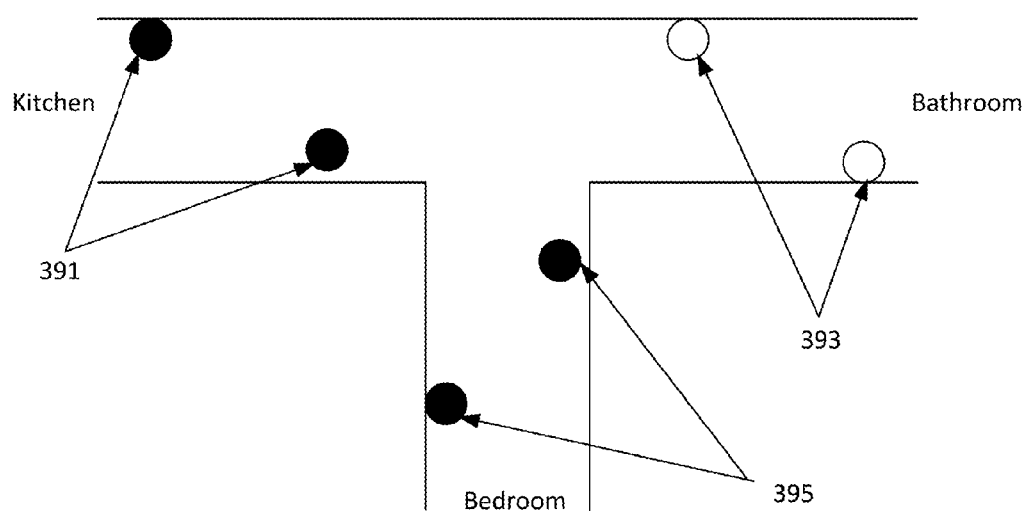
FIG. 3C is an example configuration of a hallway with a first and second group of path lights, of which only the second group is active, that can adapt to a learned pattern of behavior as disclosed herein.

The path light 301 may be a component of a smart home system as described below and may learn the appropriate intensity to illuminate the light source 340 and/or compensate for the feedback caused by the illumination of the light source 340. In an implementation, the ambient light sensor 350 may measure the amount of light it receives over a period of time, such as two or more days. A processor receiving the path light's measurements as well as other path lights' measurements may discern a pattern of illumination. For example, it may determine that path lights that are active between 11:00 PM and 11:30 PM correspond to a path a user is taking from a bedroom to a bathroom. In contrast, path lights that are active between 5:30 AM and 6:00 AM may be those that correspond to a path a user is taking from the bedroom to the kitchen. FIG. 3B is an example configuration of a hallway with a first and second combination of path lights 391, 393, 395, of which only the first combination 393, 395 is active, that can adapt to a learned pattern of behavior as disclosed herein. FIG. 3C is an example configuration of the hallway in which only the second combination 391, 395 of path lights 391, 393, 395 is active. A user may exit the bedroom into the hallway at 11:15 PM. The path lights 395 may detect the user's presence by a motion sensor integrated therewith. The path lights 391, 393, 395 may be connected to a smart home environment and, based on the learned behavior for this particular user at this particular location at this particular time, it may illuminate a first combination of lights 393, 395 for a path to the bathroom. At 5:59 AM, the user may again exit the bedroom and the user's presence may again be observed by a motion sensor integrated with the path lights 395. Based on the time of day, the learned behavior of the user, and/or the level of light detected by the ambient light sensors of the path lights 391, 393, 395, the system may illuminate a second combination of path lights 391, 395. As indicated above, the path lights 391, 393, 395 illuminated in one circumstance may overlap in part with the path lights 391, 393, 395 illuminated in a second circumstance. Thus, by observing patterns of illumination of multiple path lights, the system may anticipate a pathway to illuminate without first detecting movement.

In some instances, the system may illuminate a first group of path lights 395 based on motion detected near the bedroom entryway. Based on the time of the motion, the system may predict that the user is likely headed to the bathroom. It may reduce the threshold of motion required to activate a second group of path lights 393 and/or increase the threshold required to activate a third group of path lights 391. In some instances, the sensitivity of the motion sensor may be increased for the second group of path lights 393 and/or decreased for the third path light 391. A threshold, for example, may refer to the amount of motion that necessary for the light source of the path light to illuminate. A sensitivity may refer to how easily a motion sensor detects motion. A lower sensitivity may indicate that the sensor is less likely to detect motion while a higher sensitivity may indicate that the sensor is more likely to detect motion. The threshold and/or sensitivity of particular path lights may be adjusted based on the activity of other path lights and paths that the system has learned. In this example, based on the time of day and the origin of the motion, the system may determine that the user is likely headed to the bathroom and may reduce the threshold amount of motion required to trigger or activate the path light and/or increase the sensitivity of the second group of path lights 393 in anticipation of the user moving that direction. Similarly, it may increase the threshold amount of movement for the third group of path lights 391 and/or reduce the sensitivity of the third group of path lights 391. The user, therefore, may opt to move to the kitchen and the third group of path lights 393, upon detecting the threshold level of motion, may illuminate. When the third group of path lights 391 illuminate, the system may return the threshold and/or sensitivity of the second group of path lights 393 to a default level.

In some configurations, the processor 310 may determine the learned behavior based on a pattern of illumination of the path light 301.

FIGS. 3B and 3C also are illustrative of how a path light may have a field of view. For example, the path light closest to the bedroom may have a first field of view that may partially overlap or not overlap with a field of view of a path light that is closest to the kitchen. The field of view may be based on a sensor's field of view such as a motion sensor. The motion sensor may be integrated into the path light or a separate device. Thus, motion may be detected in the field of view of a first path light. The motion may not be in the field of view of an adjacent or second path light. Nonetheless, the second path light may receive an indication of the motion detected by the first path light. The second path light may receive the indication as though it has detected motion within its field of view and it may illuminate if the ambient light sensor, for example, determines the area is below the light threshold.

Figure 4A:
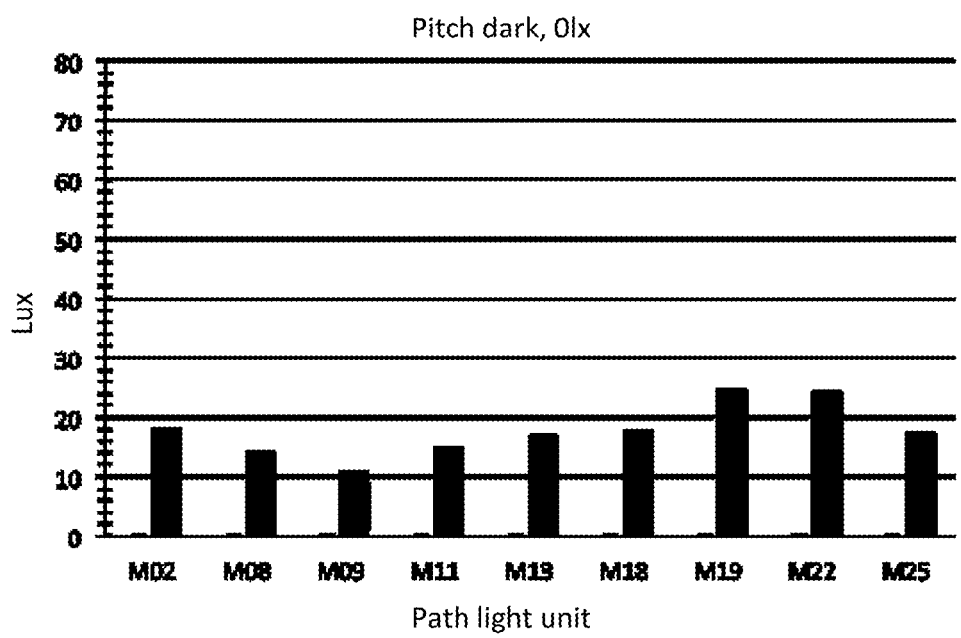
FIG. 4A shows an example of illuminance measurements obtained from the path light in a completely dark (e.g., 0 lx) room.
Figure 4B:
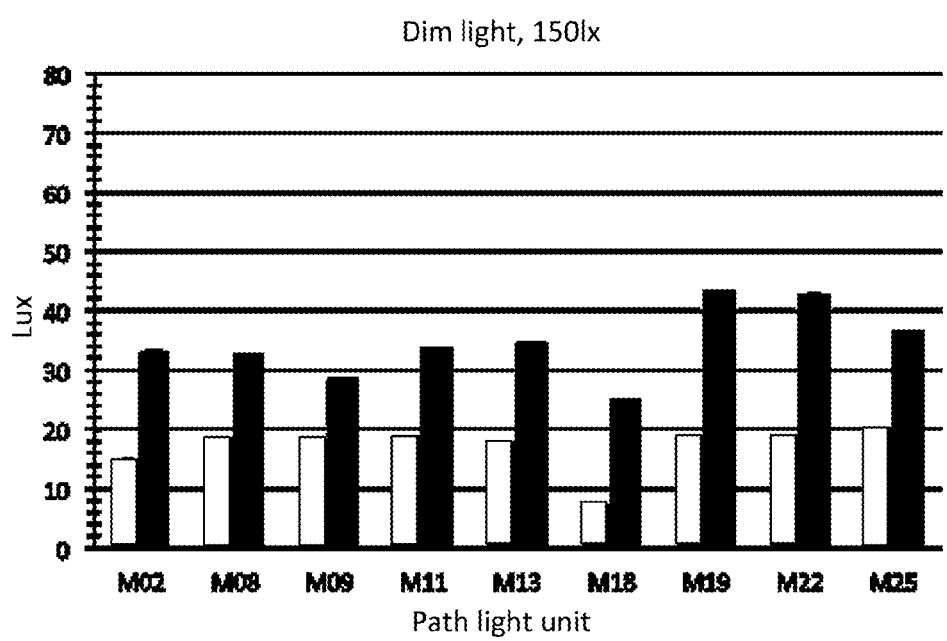
FIG. 4B shows an example of illuminance measurements obtained from the path light in a dimly lit room (e.g., 150 lx).
Figure 4C:
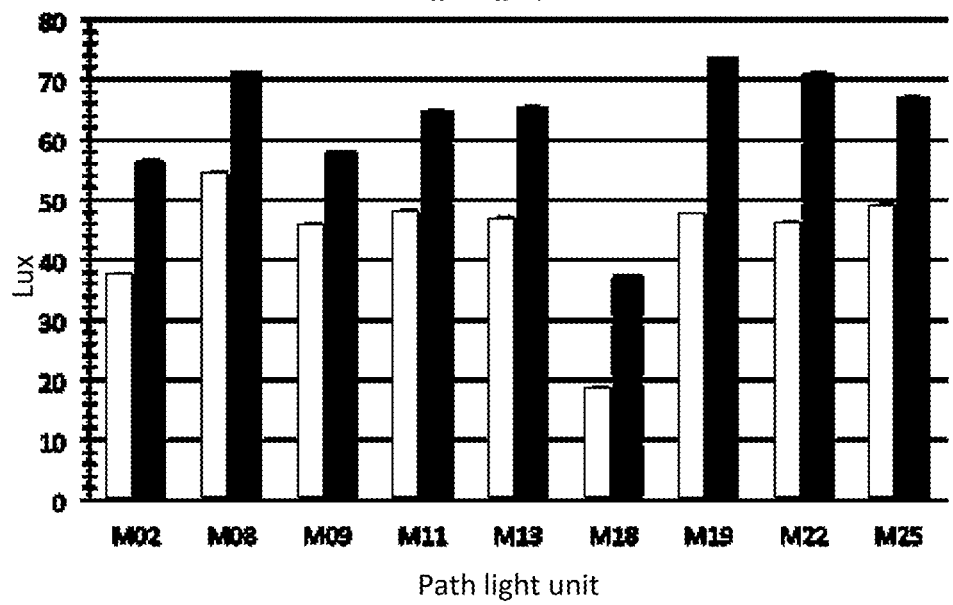
FIG. 4C is an example of illuminance measurements obtained from the path light in a bright room (e.g., 400 lx).

FIGS. 4A-4C are examples of obtaining illuminance data from the light sensor 350 in the path light 301 based on different room light conditions and with a light source on (black bars) or off (white bars). FIG. 4A shows an example of illuminance measurements obtained from the path light in a completely dark (e.g., 0 lx) room. FIG. 4B shows an example of illuminance measurements obtained from the path light in a dimly lit room (e.g., 150 lx). FIG. 4C is an example of illuminance measurements obtained from the path light in a bright room (e.g., 400 lx). In each of FIGS. 4A-4C, a path light is represented by an M number in which the  are two integers (e.g., M08 or M19). The same path lights are used in all of FIGS. 4A-4C.

As is shown by FIGS. 4A-4C, when the LED of the path light is illuminated, the ambient light sensor detects an additional amount of light. To highlight a specific example, in FIG. 4A, path light M09 shows illuminance of approximately 10 lx. In dim light, the same path light shows illuminance of approximately 30 lx when the LED is on compared to approximately 18 lx when the LED is off. In bright light, M09 has illuminance of approximately 58 lx with the LED on and 45 lx with the LED off. Thus, the amount of feedback from the LED (e.g., light source) can observed for each path light shown in FIGS. 4A-4C.

Returning to FIG. 3A, the processor 310 can compute an offset value that may represent the difference between the first ambient light value and the second ambient light value. For example, for each path light shown in FIGS. 4B and 4C, the difference in the illuminance may be computed based on the light source being on as compared to it being off. Continuing with the above example with respect to M09, a first ambient light value may correspond to 30 lx when the light is on and 18 lx when the light is off in a dimly lit room, as shown in FIG. 4B. The offset value for M09 may be 12 lx for the dimly lit room. Similarly, in a bright room such as FIG. 4C, the offset value for M09 may be the difference between the measured light when the M09 LED is on, and when the M09 LED is off, i.e., 13 lx (58 lx−45 lx).

The path light may be a "smart" device that can learn appropriate offsets for its particular conditions. For example, upon being located in an environment, the path light may begin to measure the amount of light it receives throughout a period of time, and may identify patterns in the ambient light in the area of the path light. The patterns may be identified or learned by the path light directly, or by another local or remote component of a smart home or similar environment. For example, the path light may learn a light and dark cycle for its particular environment. Based on the measurements of ambient light detected over a period of time, the path light may determine an ambient light level during the period of time. It also may test various intensities of the light source and measure the amount of feedback it receives at those intensities in particular lighting conditions (e.g., bright room, dark room, etc.). Thus, multiple offset values may be computed for each path light depending on the lighting conditions of its location. For example, M09 may utilize no offset in 0 lx-124 lx lighting conditions, 12 lx in conditions ranging from 125 lx to 250 lx, and 13 lx for any room lighting conditions that exceed 251 lx.

In some configurations, the path light may average the offset value for lighting conditions within a particular range. For example, M09 may average the 12 lx offset computed for the dimly lit room in FIG. 4B with the 13 lx offset computed for the brightly lit room in FIG. 4C. It may utilize an offset value of 12.5 lx irrespective of the lighting conditions of the room or in the event the room has a lux that exceeds 60 lx with no light source illuminated.

Returning to FIG. 3A, the processor 310 may, upon learning the one or more offset values for a path light 301, store the offset values and/or send the offset values to the controller and/or remote system 305. The processor 310 may be configured to continue to learn the lighting conditions of its environment over time. It may periodically re-compute one or more of the offset values. For example, a user may move the path light to a new location with different lighting conditions, at which point the path light or the smart home system may re-learn light patterns in the new location. As another example, other lighting conditions in the environment may change, such as where a user installs a new lamp or other light source, changes window treatments, or the like.

Figure 5C:
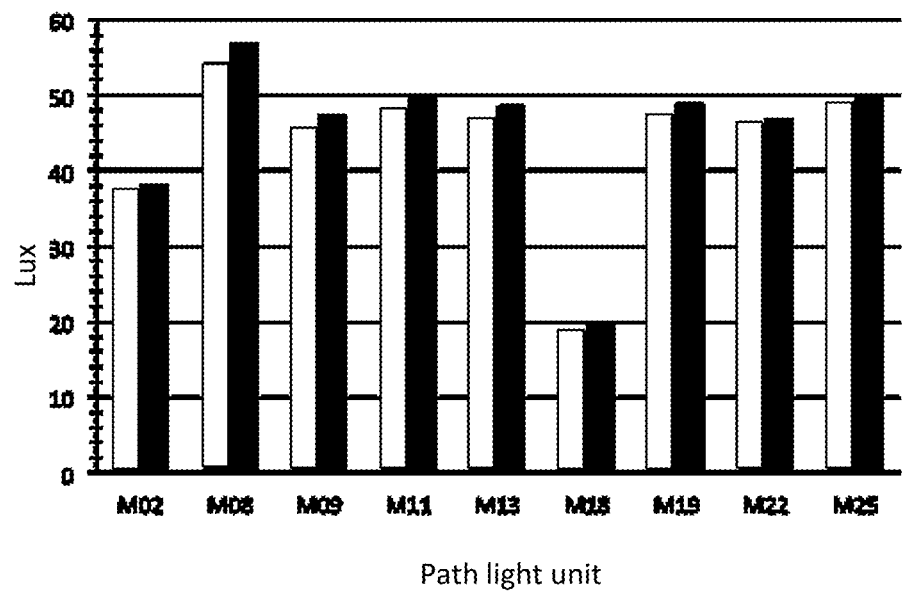
FIG. 5C is an example of a bright room (e.g., 400 lx) with the same nine path lights and their light sources turned on or off as disclosed herein.

FIGS. 5A-5C represent the illuminance in the same three room lighting conditions as FIGS. 4A-4C, with a computed offset value being used to remove the feedback obtained from illumination of the light source of the path light. FIG. 5A is an example of a dark room (e.g., 0 lx) in which the light source is off (white bars) or on (black bars). FIG. 5B is an example of a dimly lit (e.g., 150 lx) room in which the light source for nine path lights was turned on (black bars) or off (white bars) and the illuminance was measured. FIG. 5C is an example of a bright room (e.g., 400 lx) with the same nine path lights and their light sources turned on or off. Continuing the previous example, the offset for M09 can be subtracted from the light sensor's measurements when the M09 light source is active in a 150 lx environment or 400 lx environment as shown in FIGS. 5B and 5C, respectively. Other room illumination values may have different offsets and, as can be seen from FIGS.

5B and 5C, each path light may have slightly different levels of illumination or ability to detect light. By subtracting the offset value for M09 in FIG. 5B from the amount of light detected by the light sensor, the resulting values of the light sensor's readings are reduced to a level that matches an amount of light that it detects when the light source is off, thereby compensating for the feedback of the light source.

The path light 301 may include a motion sensor (not shown) such as a passive infrared sensor. The first ambient light value and the second ambient light value may be utilized to ascertain the offset value. The processor 301 may compute a third ambient light value based on a third amount of light detected by the ambient light sensor 350. The third ambient light value may correspond to an amount of light detected by the ambient light sensor subsequent to determining an offset value. Upon learning the offset value as described above, the processor 301 may determine an illumination level of the light source 340 based on the third ambient light value and the detected motion. For example, the processor 301 may utilize the logic shown in FIG. 1 to determine whether to illuminate the light source 340. For example, the third ambient light value may be at 35 lx in a 150 lx room environment (e.g., a hallway). Without computing the offset value, when the light source for the path light illuminates, the light sensor may determine that the amount of light it is detecting exceeds a threshold value for it to turn off or begin fading out. With the offset value, however, the path light may determine an illumination level of the light source and follow the processes shown in FIG. 1. For example, without the offset computation, the ambient light sensor may determine that it is not dark and incorrectly deactivate the light source.

FIG. 6 is an example process for determining an offset value for path light as according to an implementation. At 610, a first ambient light value may be determined based on a first amount of light detected by an ambient light sensor as disclosed above. A light source integrated into a device with the ambient light sensor may be illuminated at 620 as shown in FIG. 3A. A hardware component (e.g., a light source) being integrated into the device may refer to the component being physically housed in the same enclosure as other components of the device. For example, a path light may contain a light sensor and a light source in a single device or enclosure. A motion sensor may be included in the same device or be a separate device. A second ambient light value may be determined at 630. The second ambient light value may be based on a second amount of light detected by the ambient light sensor when the light source of the path light is illuminated at an intensity. As described with respect to FIGS. 4A-4C and 5A-5C, an offset value may be computed at 640. The offset value may correspond to the difference between the first ambient light value and the second ambient light value (or absolute value thereof). As described above, this process may indicate the amount of offset that a particular path light may utilize given its environment.

The offset computed at 640 may be utilized by the path light to compensate for the feedback from the light source at different intensities. Upon determining the offset, the path light may obey the logic provided in FIG. 1, for example. At 650, motion may be detected, for example, within the field of view of a motion sensor that may be associated with the path light. If the path light's motion sensor detects motion within its field of view, it may illuminate the light source. In the example provided in FIG. 6, at 660, a third ambient light value may be determined based on the amount of light detected by the ambient light sensor and the offset value. At 670, an illumination level of the light source may be determined based on the third ambient light value and the detected motion.

Figure 7:
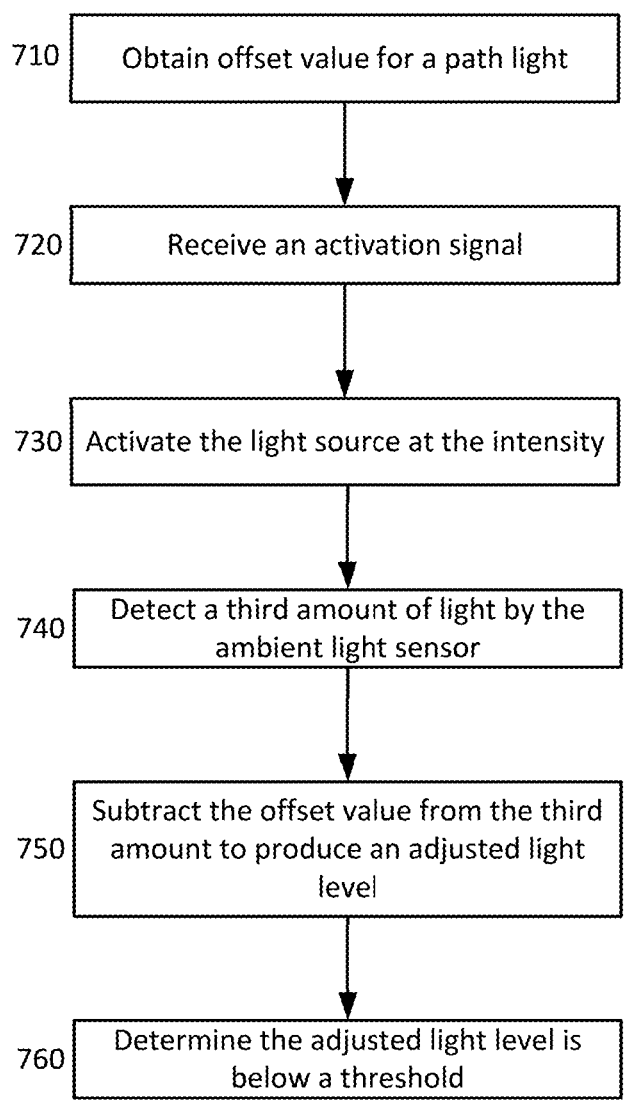
FIG. 7 is an example process for determining an adjusted light level is below a threshold as disclosed herein.

FIG. 7 is an example process for determining an adjusted light level is below a threshold. An offset value for a path light may be obtained at 710 as described above. The offset value may correspond to the difference between a first amount of light detected by ambient light sensor of the path light when a light source of the path light is illuminated at an intensity and a second amount of light detected by the ambient light sensor when the light source is inactive. The path light may receive an activation signal at 720. The activation signal may correspond to movement being detected in proximity to the path light. The activation signal may be received from a controller and/or remote system in response to a security event or abnormality detected in the smart home environment (e.g., smoke, fire, carbon monoxide, etc.). The activation signal may be received from a second path light that has detected motion in its field of view. Responsive to the activation signal being received, the light source may be activated at 730. The intensity of the light may be the same intensity as that utilized in the determination of the offset value.

A third amount of light may be detected by the ambient light sensor at 740. The third amount of light may correspond to light detected by the ambient light sensor subsequent to the offset being determined. For example, a user may exit a bedroom into a hallway such as the example depicted in FIG. 3B. The path lights 393, 395 may illuminate upon detecting the user's presence (e.g., a motion sensor associated with the 395 path lights may signal the 393 and 395 path lights to illuminate). The ambient light sensor associated with each path light may being to receive feedback caused by the illumination of the path lights 393, 395. The ambient light sensor may measure the amount of light as the third amount of light detected in FIG. 7 at 740. The offset value may be subtracted by the third amount to produce an adjusted light level at 750. The adjusted light level may provide a more accurate indication of the light level of the environment as illustrated above with respect to FIGS. 4A-4C and 5A-5C. The more accurate representation of the light level mitigates the likelihood that the path light ambient light sensor will thin it is brighter than it actually is, thereby inactivating the light prematurely. The adjusted light level may be determined to be below a threshold at 760. Responsive to determining that the adjusted light level is below the threshold, a light source of the path light may be illuminated.

The threshold may be configured by the path light manufacturer, a user, a path light, and/or a controller. For example, the path light may observe ambient light sensor readings over a period of time. It may determine the maximum and minimum amount of light detected in the environment. Based on that determination, it may determine that "dark" may correspond to a value that is less than or equal to 10% of the minimum amount of light detected. As another example, it may determine that "dark" may represent 15% of the average of the maximum and minimum light levels. The path light, controller, and/or remote system may be programmed to compute a threshold using a variety of other formulas.

Figure 8:
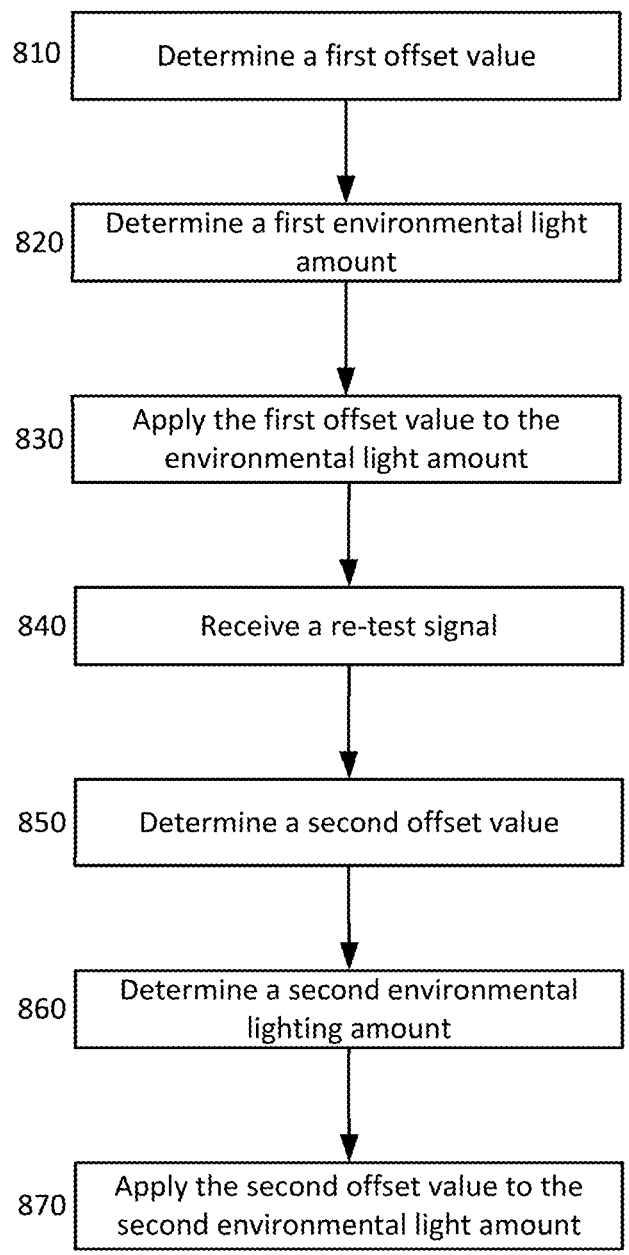
FIG. 8 is an example process for adjusting the offset value based on a change of lighting conditions as disclosed herein.

FIG. 8 is an example process for adjusting the offset value based on a change of lighting conditions. A first offset value for a path light may be determined at 810 as described earlier. The first offset value may correspond to the difference between a first amount of light detected by an ambient light sensor of the path light when a light source of the path light is illuminated at an intensity and a second amount of light detected by the ambient light sensor when the light source is inactive. At 820, a first environmental light amount may be determined by the ambient light sensor. The environmental light amount may correspond to the amount of light the ambient light sensor is exposed to in its environment. The first offset value may be applied to the environmental light amount at 830. A re-test signal may be received at 840. A re-test signal may refer to a signal received from pressing a reset button the path light, which may cause the path light to compute an offset value again. The re-test signal may be based on a change in light conditions of the path light. For example, the path light may sample the amount of light in its environment and determine the amount of light present. Seasonal changes in lighting, a change in the location of the path light, and/or a new window treatment (e.g., curtains or blinds) may affect the offset value. Similarly, an intensity of a light may change over time and the offset value may need to be adjusted in response thereto. Responsive to the re-test signal, a second offset value for the path light may be determined at 850. The second offset value may correspond to the difference between a third amount of light detected by an ambient light sensor of the path light when the light source of the path light is illuminated at the intensity and a fourth amount of light detected by the ambient light sensor when the light source is inactive. The second offset value may be different from the first offset value. A second environmental lighting amount may be determined by the ambient light sensor at 860. The second offset value may be applied to the second environmental light amount at 870. The second environmental light amount may be determined to be below a threshold as described above. The light source may be illuminated based on the determination that the second environmental light amount is below a threshold.

Implementations disclosed herein may use one or more sensors. In general, a "sensor" may refer to any device that can obtain information about its environment. Sensors may be described in terms of the type of information they collect. For example, sensor types as disclosed herein may include motion, smoke, carbon monoxide, proximity, temperature, time, physical orientation, acceleration, location, entry, presence, pressure, light, sound, and the like. A sensor also may be described in terms of the particular physical device that obtains the environmental information. For example, an accelerometer may obtain acceleration information, and thus may be used as a general motion sensor and/or an acceleration sensor. As another example, an ambient light sensor may be utilized as a light sensor and a relative time of day sensor. A sensor also may be described in terms of the specific hardware components used to implement the sensor. For example, a temperature sensor may include a thermistor, thermocouple, resistance temperature detector, integrated circuit temperature detector, or combinations thereof. A sensor also may be described in terms of a function or functions the sensor performs within an integrated sensor network, such as a smart home or home security system environment as disclosed herein. For example, a sensor may operate as a security sensor when it is used to determine security events such as unauthorized entry. As a specific example, an ambient light sensor of the path light may include a motion sensor and, if it detects motion when the smart home is in an away state (as described below), then it may send an indication of the possible intrusion to a controller of the smart home.

A sensor may operate with different functions at different times, such as where a motion sensor is used to control lighting in a smart home environment when an authorized user is present, and is used to alert to unauthorized or unexpected movement when no authorized user is present, or when an alarm system is in an away (e.g., "armed") state, or the like. In some cases, a sensor may operate as multiple sensor types sequentially or concurrently, such as where a temperature sensor is used to detect a change in temperature, as well as the presence of a person or animal. A sensor also may operate in different modes at the same or different times. For example, a sensor may be configured to operate in one mode during the day and another mode at night. As another example, a sensor may operate in different modes based upon a state of a home security system or a smart home environment, or as otherwise directed by such a system.

In general, a "sensor" as disclosed herein may include multiple sensors or sub-sensors, such as where a position sensor includes both a global positioning sensor (GPS) as well as a wireless network sensor, which provides data that can be correlated with known wireless networks to obtain location information. Multiple sensors may be arranged in a single physical housing, such as where a single device includes movement, temperature, magnetic, and/or other sensors. Such a housing may be referred to as a sensor, a sensor device, or a sensor package. For clarity, sensors are described with respect to the particular functions they perform and/or the particular physical hardware used, when such specification is necessary for understanding of the embodiments disclosed herein. As a specific example, a path light, as disclosed herein may contain a light source, an ambient light sensor, and a motion sensor.

Figure 9A:
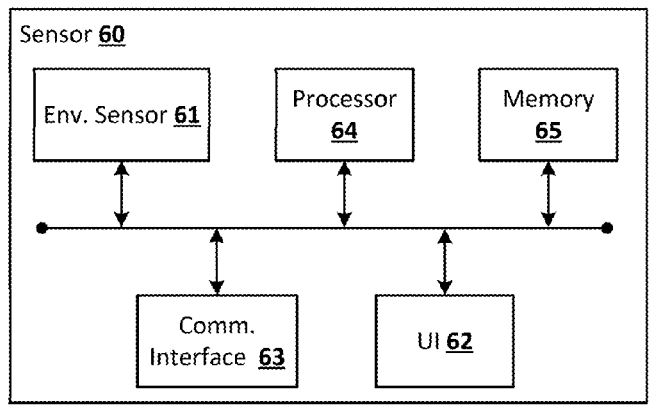
FIG. 9A shows an example sensor as disclosed herein.

A sensor may include hardware in addition to the specific physical sensor that obtains information about the environment. FIG. 9A shows an example sensor as disclosed herein. The sensor 60 may include an environmental sensor 61, such as a temperature sensor, smoke sensor, carbon monoxide sensor, motion sensor, accelerometer, proximity sensor, passive infrared (PIR) sensor, magnetic field sensor, radio frequency (RF) sensor, light sensor, humidity sensor, pressure sensor, microphone, or any other suitable environmental sensor, that obtains a corresponding type of information about the environment in which the sensor 60 is located. A processor 64 may receive and analyze data obtained by the sensor 61, control operation of other components of the sensor 60, and process communication between the sensor and other devices. The processor 64 may execute instructions stored on a computer-readable memory 65. The memory 65 or another memory in the sensor 60 may also store environmental data obtained by the sensor 61. For example, the path light's ambient light sensor may store light measurements to the memory 65. The light measurements may be communicated by the interface 63 to a controller and/or remote system as disclosed herein. A communication interface 63, such as a Wi-Fi or other wireless interface, Ethernet or other local network interface, or the like may allow for communication by the sensor 60 with other devices. A user interface (UI) 62 may provide information and/or receive input from a user of the sensor. The UI 62 may include, for example, a speaker to output an audible alarm when an event is detected by the sensor 60. Alternatively, or in addition, the UI 62 may include a light to be activated when an event is detected by the sensor 60. The user interface may be relatively minimal, such as a liquid crystal display (LCD), light-emitting diode (LED) display, or limited-output display, or it may be a full-featured interface such as a touchscreen.

Components within the sensor 60 may transmit and receive information to and from one another via an internal bus or other mechanism as will be readily understood by one of skill in the art. One or more components may be implemented in a single physical arrangement, such as where multiple components are implemented on a single integrated circuit. Sensors as disclosed herein may include other components, and/or may not include all of the illustrative components shown.

In some configurations, two or more sensors may generate data that can be used by a processor of a system to generate a response and/or infer a state of the environment. For example, an ambient light sensor of a path light in a room may determine that the room is dark (e.g., less than 60 lx). A microphone in the room may detect a sound above a set threshold, such as 60 dB. The system processor may determine, based on the data generated by both sensors that it should activate one or more lights in the room. In the event the processor only received data from the ambient light sensor, the system may not have any basis to alter the state of the lighting in the room. Similarly, if the processor only received data from the microphone, the system may lack sufficient data to determine whether activating the lights in the room is necessary. For example, during the day the room may already be bright or during the night the lights may already be on. The amount of light measured by the ambient light sensor of the path light, therefore, may be higher than a threshold level. The system, therefore, may not activate the lights because the room is already bright enough (e.g., above the threshold level). As another example, two or more sensors may communicate with one another. Thus, data generated by multiple sensors simultaneously or nearly simultaneously may be used to determine a state of an environment and, based on the determined state, generate a response.

In some configurations, an accelerometer may be employed to indicate how quickly the door is moving. For example, the door may be lightly moving due to a breeze. This may be contrasted with a rapid movement due to a person swinging the door open. The data generated by the compass, accelerometer, and/or magnetometer may be analyzed and/or provided to a central system such as a controller 73 and/or remote system 74 as previously described. The data may be analyzed to learn a user behavior, an environment state, and/or as a component of a home security or home automation system. While the above example is described in the context of a door, a person having ordinary skill in the art will appreciate the applicability of the disclosed subject matter to other implementations such as a window, garage door, fireplace doors, vehicle windows/doors, faucet positions (e.g., an outdoor spigot), a gate, seating position, etc.

Data generated by one or more sensors may indicate a behavior pattern of one or more users and/or an environment state over time, and thus may be used to "learn" such characteristics. For example, data generated by an ambient light sensor of a path light in a room of a house and the time of day may be stored in a local or remote storage medium with the permission of an end user. A processor in communication with the storage medium may compute a behavior based on the data generated by the light sensor. The path light's light sensor data may indicate that the amount of light detected increases until an approximate time or time period, such as 3:30 PM, and then declines until another approximate time or time period, such as 5:30 PM, at which point there an abrupt increase in the amount of light is detected. In many cases, the amount of light detected after the second time period may be either below a dark level of light (e.g., under or equal to 60 lx) or bright (e.g., equal to or above 400 lx). In this example, the data may indicate that after 5:30 PM, an occupant is turning on/off a light as the occupant of the room in which the sensor is located enters/leaves the room. At other times, the light sensor data may indicate that no lights are turned on/off in the room. The system, therefore, may learn that occupants patterns of turning on and off lights, and may generate a response to the learned behavior. For example, at 5:30 PM, a smart home environment or other sensor network may automatically activate the lights in the room if it detects an occupant in proximity to the home. In some embodiments, such behavior patterns may be verified using other sensors. Continuing the example, user behavior regarding specific lights may be verified and/or further refined based upon states of, or data gathered by, smart switches, outlets, lamps, and the like.

Sensors as disclosed herein may operate within a communication network, such as a conventional wireless network, and/or a sensor-specific network through which sensors may communicate with one another and/or with dedicated other devices. In some configurations, one or more sensors may provide information to one or more other sensors, to a central controller, or to any other device capable of communicating on a network with the one or more sensors. A central controller may be general- or special-purpose. For example, one type of central controller is a home automation network that collects and analyzes data from one or more sensors within the home. Another example of a central controller is a special-purpose controller that is dedicated to a subset of functions, such as a security controller that collects and analyzes sensor data primarily or exclusively as it relates to various security considerations for a location. A central controller may be located locally with respect to the sensors with which it communicates and from which it obtains sensor data, such as in the case where it is positioned within a home that includes a home automation and/or sensor network. Alternatively or in addition, a central controller as disclosed herein may be remote from the sensors, such as where the central controller is implemented as a cloud-based system that communicates with multiple sensors, which may be located at multiple locations and may be local or remote with respect to one another. For example, the path light may communicate motion sensor and/or light sensor data and/or signals to the controller. As described above, the controller may process the received data and/or signals as part of a larger home security system or smart home system. The data, for example, may be utilized to detect a potential intrusion into the home. Similarly, the controller may communicate to the path light an override instruction such as an instruction to illuminate the path light because a fire is detected.

Figure 9B:
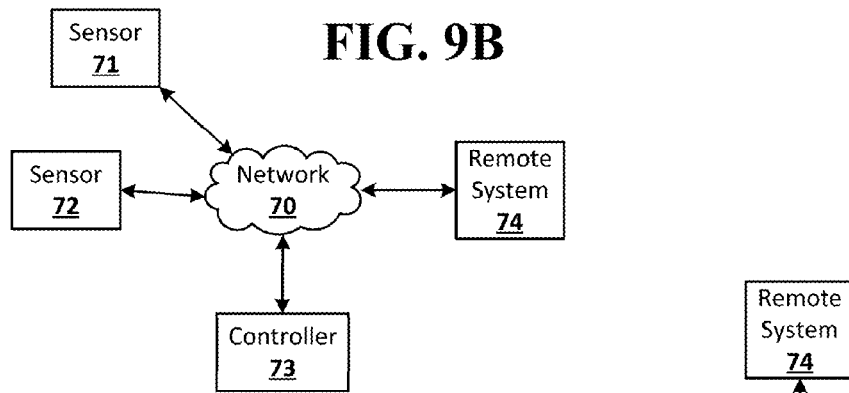
FIG. 9B shows an example of a sensor network as disclosed herein.

FIG. 9B shows an example of a sensor network as disclosed herein, which may be implemented over any suitable wired and/or wireless communication networks. One or more sensors 71, 72, such as a path light, may communicate via a local network 70, such as a Wi-Fi or other suitable network, with each other and/or with a controller 73. The controller may be a general- or special-purpose computer such as a smartphone, a smartwatch, a tablet, a laptop, etc. The controller may, for example, receive, aggregate, and/or analyze environmental information received from the sensors 71, 72. The sensors 71, 72 and the controller 73 may be located locally to one another, such as within a single dwelling, office space, building, room, or the like, or they may be remote from each other, such as where the controller 73 is implemented in a remote system 74 such as a cloud-based reporting and/or analysis system. In some configurations, the system may have multiple controllers 74 such as where multiple occupants' smartphones and/or smartwatches are authorized to control and/or send/receive data to or from the various sensors 71, 72 deployed in the home. Alternatively or in addition, sensors may communicate directly with a remote system 74. The remote system 74 may, for example, aggregate data from multiple locations, provide instruction, software updates, and/or aggregated data to a controller 73 and/or sensors 71, 72.

The devices of the security system and smart-home environment of the disclosed subject matter may be communicatively connected via the network 70, which may be a mesh-type network such as Thread, which provides network architecture and/or protocols for devices to communicate with one another. Typical home networks may have a single device point of communications. Such networks may be prone to failure, such that devices of the network cannot communicate with one another when the single device point does not operate normally. The mesh-type network of Thread, which may be used in the security system of the disclosed subject matter, may avoid communication using a single device. That is, in the mesh-type network, such as network 70, there is no single point of communication that may fail and prohibit devices coupled to the network from communicating with one another. As an example, multiple path lights may be deployed in and around a home. Each path light may be a component of the mesh network and send/receive data from other sensors and/or devices in the mesh network or other networks.

The communication and network protocols used by the devices communicatively coupled to the network 70 may provide secure communications, minimize the amount of power used (i.e., be power efficient), and support a wide variety of devices and/or products in a home, such as appliances, access control, climate control, energy management, lighting, safety, and security. For example, the protocols supported by the network and the devices connected thereto may have an open protocol which may carry IPv6 natively.

The Thread network, such as network 70, may be easy to set up and secure to use. The network 70 may use an authentication scheme, AES (Advanced Encryption Standard) encryption, or the like to reduce and/or minimize security holes that exist in other wireless protocols. The Thread network may be scalable to connect devices (e.g., 2, 5, 10, 20, 50, 100, 150, 200, or more devices) into a single network supporting multiple hops (e.g., to provide communications between devices when one or more nodes of the network is not operating normally). The network 70, which may be a Thread network, may provide security at the network and application layers. One or more devices communicatively coupled to the network 70 (e.g., controller 73, remote system 74, and the like) may store product install codes to ensure only authorized devices can join the network 70. One or more operations and communications of network 70 may use cryptography, such as public-key cryptography.

The devices communicatively coupled to the network 70 of the smart-home environment and/or security system disclosed herein may low power consumption and/or reduced power consumption. That is, devices efficiently communicate to with one another and operate to provide functionality to the user, where the devices may have reduced battery size and increased battery lifetimes over conventional devices. The devices may include sleep modes to increase battery life and reduce power requirements. For example, communications between devices coupled to the network 70 may use the power-efficient IEEE 802.15.4 MAC/PHY protocol. In embodiments of the disclosed subject matter, short messaging between devices on the network 70 may conserve bandwidth and power. The routing protocol of the network 70 may reduce network overhead and latency. The communication interfaces of the devices coupled to the smart-home environment may include wireless system-on-chips to support the low-power, secure, stable, and/or scalable communications network 70.

The sensor network shown in FIG. 9B may be an example of a smart-home environment. The depicted smart-home environment may include a structure, a house, office building, garage, mobile home, or the like. The devices of the smart home environment, such as the sensors 71, 72, the controller 73, and the network 70 may be integrated into a smart-home environment that does not include an entire structure, such as an apartment, condominium, or office space.

The smart home environment can control and/or be coupled to devices outside of the structure. For example, one or more of the sensors 71, 72 may be located outside the structure, for example, at one or more distances from the structure (e.g., sensors 71, 72 may be disposed outside the structure, at points along a land perimeter on which the structure is located, and the like. One or more of the devices in the smart home environment need not physically be within the structure. For example, the controller 73 which may receive input from the sensors 71, 72 may be located outside of the structure. For example, multiple path lights may illuminate a pathway to a front door of a residence.

The structure of the smart-home environment may include a plurality of rooms, separated at least partly from each other via walls. The walls can include interior walls or exterior walls. Each room can further include a floor and a ceiling. Devices of the smart-home environment, such as the sensors 71, 72, may be mounted on, integrated with and/or supported by a wall, floor, or ceiling of the structure.

The smart-home environment including the sensor network shown in FIG. 9B may include a plurality of devices, including intelligent, multi-sensing, network-connected devices, that can integrate seamlessly with each other and/or with a central server or a cloud-computing system (e.g., controller 73 and/or remote system 74) to provide home-security and smart-home features. The smart-home environment may include one or more intelligent, multi-sensing, network-connected thermostats (e.g., "smart thermostats" or path lights), one or more intelligent, network-connected, multi-sensing hazard detection units (e.g., "smart hazard detectors"), and one or more intelligent, multi-sensing, network-connected entryway interface devices (e.g., "smart doorbells"). The smart hazard detectors, smart thermostats, and smart doorbells may be the sensors 71, 72 shown in FIG. 9B.

For example, a smart thermostat may detect ambient climate characteristics (e.g., temperature and/or humidity) and may control an HVAC (heating, ventilating, and air conditioning) system accordingly of the structure. For example, the ambient client characteristics may be detected by sensors 71, 72 shown in FIG. 9B, and the controller 73 may control the HVAC system (not shown) of the structure.

As another example, a smart hazard detector may detect the presence of a hazardous substance or a substance indicative of a hazardous substance (e.g., smoke, fire, or carbon monoxide). For example, smoke, fire, and/or carbon monoxide may be detected by sensors 71, 72 shown in FIG. 9B, and the controller 73 may control an alarm system to provide a visual and/or audible alarm to the user of the smart-home environment.

As another example, a smart doorbell may control doorbell functionality, detect a person's approach to or departure from a location (e.g., an outer door to the structure), and announce a person's approach or departure from the structure via audible and/or visual message that is output by a speaker and/or a display coupled to, for example, the controller 73.

In some embodiments, the smart-home environment of the sensor network shown in FIG. 9B may include one or more intelligent, multi-sensing, network-connected wall switches (e.g., "smart wall switches"), one or more intelligent, multi-sensing, network-connected wall plug interfaces (e.g., "smart wall plugs"). The smart wall switches and/or smart wall plugs may be or include one or more of the sensors 71, 72 shown in FIG. 9B. A smart wall switch may detect ambient lighting conditions, and control a power and/or dim state of one or more lights. For example, a sensor such as sensors 71, 72, may detect ambient lighting conditions, and a device such as the controller 73 may control the power to one or more lights (not shown) in the smart-home environment. Smart wall switches may also control a power state or speed of a fan, such as a ceiling fan. For example, sensors 72, 72 may detect the power and/or speed of a fan, and the controller 73 may adjust the power and/or speed of the fan, accordingly. Smart wall plugs may control supply of power to one or more wall plugs (e.g., such that power is not supplied to the plug if nobody is detected to be within the smart-home environment). For example, one of the smart wall plugs may control supply of power to a lamp (not shown).

In embodiments of the disclosed subject matter, a smart-home environment may include one or more intelligent, multi-sensing, network-connected entry detectors (e.g., "smart entry detectors"). Such detectors may be or include one or more of the sensors 71, 72 shown in FIG. 10B. The illustrated smart entry detectors (e.g., sensors 71, 72) may be disposed at one or more windows, doors, and other entry points of the smart-home environment for detecting when a window, door, or other entry point is opened, broken, breached, and/or compromised. The smart entry detectors may generate a corresponding signal to be provided to the controller 73 and/or the remote system 74 when a window or door is opened, closed, breached, and/or compromised. In some embodiments of the disclosed subject matter, the alarm system, which may be included with controller 73 and/or coupled to the network 70 may not arm unless all smart entry detectors (e.g., sensors 71, 72) indicate that all doors, windows, entryways, and the like are closed and/or that all smart entry detectors are armed.

The smart-home environment of the sensor network shown in FIG. 9B can include one or more intelligent, multi-sensing, network-connected doorknobs (e.g., "smart doorknob"). For example, the sensors 71, 72 may be coupled to a doorknob of a door (e.g., doorknobs 122 located on external doors of the structure of the smart-home environment). However, it should be appreciated that smart doorknobs can be provided on external and/or internal doors of the smart-home environment.

The smart thermostats, the path lights, the smart hazard detectors, the smart doorbells, the smart wall switches, the smart wall plugs, the smart entry detectors, the smart doorknobs, the keypads, and other devices of a smart-home environment (e.g., as illustrated as sensors 71, 72 of FIG. 9B) can be communicatively coupled to each other via the network 70, and to the controller 73 and/or remote system 74 to provide security, safety, and/or comfort for the smart home environment.

A user can interact with one or more of the network-connected smart devices (e.g., via the network 70). For example, a user can communicate with one or more of the network-connected smart devices using a computer (e.g., a desktop computer, laptop computer, tablet, or the like) or other portable electronic device (e.g., a smartphone, a tablet, a key FOB, or the like). A webpage or application can be configured to receive communications from the user and control the one or more of the network-connected smart devices based on the communications and/or to present information about the device's operation to the user. For example, the user can view, arm or disarm the security system of the home. As another example, the presence of a particular user's smartphone within a threshold proximity to the home may cause one or more path lights to illuminate.

One or more users can control one or more of the network-connected smart devices in the smart-home environment using a network-connected computer or portable electronic device. In some examples, some or all of the users (e.g., individuals who live in the home) can register their mobile device and/or key FOBs with the smart-home environment (e.g., with the controller 73). Such registration can be made at a central server (e.g., the controller 73 and/or the remote system 74) to authenticate the user and/or the electronic device as being associated with the smart-home environment, and to provide permission to the user to use the electronic device to control the network-connected smart devices and the security system of the smart-home environment. A user can use their registered electronic device to remotely control the network-connected smart devices and security system of the smart-home environment, such as when the occupant is at work or on vacation. The user may also use their registered electronic device to control the network-connected smart devices when the user is located inside the smart-home environment.

Alternatively, or in addition to registering electronic devices, the smart-home environment may make inferences about which individuals live in the home and are therefore users and which electronic devices are associated with those individuals. As such, the smart-home environment may "learn" who is a user (e.g., an authorized user) and permit the electronic devices associated with those individuals to control the network-connected smart devices of the smart-home environment (e.g., devices communicatively coupled to the network 70), in some embodiments including sensors used by or within the smart-home environment. Various types of notices and other information may be provided to users via messages sent to one or more user electronic devices. For example, the messages can be sent via email, short message service (SMS), multimedia messaging service (MMS), unstructured supplementary service data (USSD), as well as any other type of messaging services and/or communication protocols.

A smart-home environment may include communication with devices outside of the smart-home environment but within a proximate geographical range of the home. For example, the smart-home environment may include an outdoor lighting system (not shown) that communicates information through the communication network 70 or directly to a central server or cloud-computing system (e.g., controller 73 and/or remote system 74) regarding detected movement and/or presence of people, animals, and any other objects and receives back commands for controlling the lighting accordingly.

The controller 73 and/or remote system 74 can control the outdoor lighting system based on information received from the other network-connected smart devices in the smart-home environment. For example, in the event that any of the network-connected smart devices, such as smart wall plugs located outdoors, detect movement at nighttime, the controller 73 and/or remote system 74 can activate the outdoor lighting system and/or other lights in the smart-home environment.

Figure 9C:
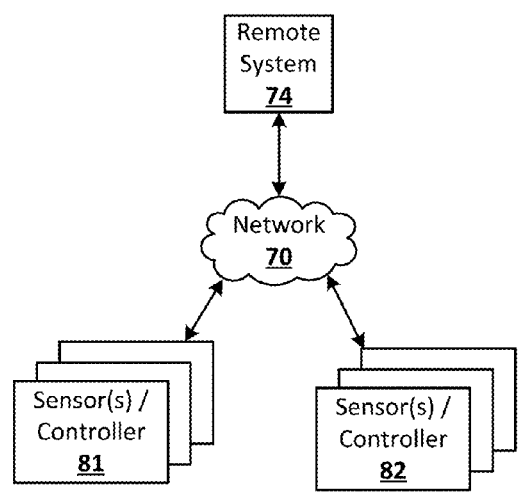
FIG. 9C shows an example configuration of sensors, one or more controllers, and a remote system as disclosed herein.

In some configurations, a remote system 74 may aggregate data from multiple locations, such as multiple buildings, multi-resident buildings, and individual residences within a neighborhood, multiple neighborhoods, and the like. In general, multiple sensor/controller systems 81, 82 as previously described with respect to FIG. 9B may provide information to the remote system 74 as shown in FIG. 9C. The systems 81, 82 may provide data directly from one or more sensors as previously described, or the data may be aggregated and/or analyzed by local controllers such as the controller 73, which then communicates with the remote system 74. The remote system may aggregate and analyze the data from multiple locations, and may provide aggregate results to each location.

For example, the remote system 74 may examine larger regions for common sensor data or trends in sensor data, and provide information on the identified commonality or environmental data trends to each local system 81, 82.

Figure 10A:
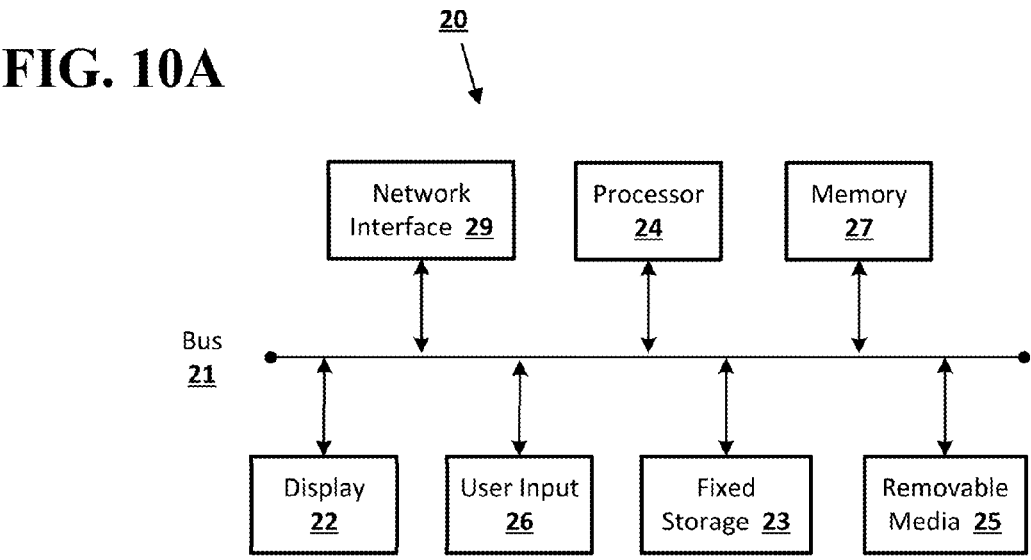
FIG. 10A shows a computer according to an implementation of the disclosed subject matter.

Implementations of the presently disclosed subject matter may be implemented in and used with a variety of component and network architectures. FIG. 10A is an example computer 20 suitable for implementations of the presently disclosed subject matter. The computer 20 includes a bus 21 which interconnects major components of the computer 20, such as a central processor 24, a memory 27 (typically RAM, but which may also include ROM, flash RAM, or the like), an input/output controller 28, a user display 22, such as a display screen via a display adapter, a user input interface 26, which may include one or more controllers and associated user input devices such as a keyboard, mouse, and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 allows data communication between the central processor 24 and the memory 27, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection, or the like. For example, the network interface 29 may allow the computer to communicate with other computers via one or more local, wide-area, or other networks, as shown in FIG. 10B.

Many other devices or components (not shown) may be connected in a similar manner (e.g., document scanners, digital cameras, and so on). Conversely, all of the components shown in FIG. 10A need not be present to practice the present disclosure. The components can be interconnected in different ways from that shown. The operation of a computer such as that shown in FIG. 8A is readily known in the art and is not discussed in detail in this application. Code to implement the present disclosure can be stored in computer-readable storage media such as one or more of the memory 27, fixed storage 23, removable media 25, or on a remote storage location.

Figure 10B:
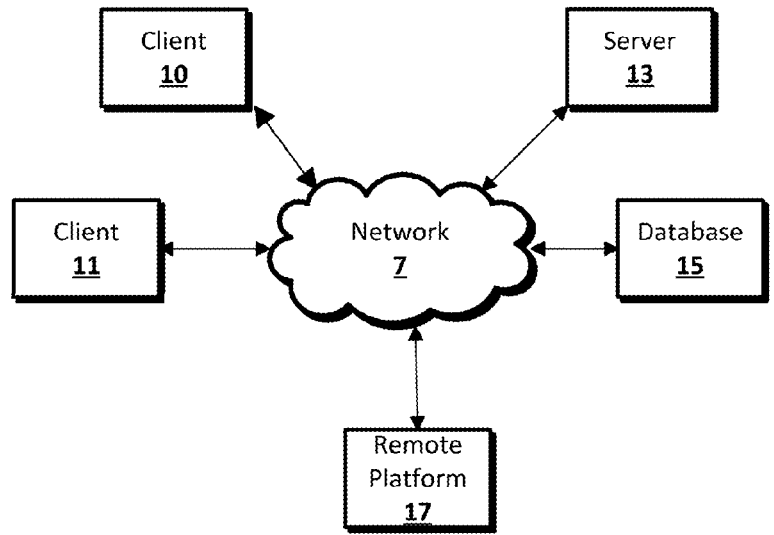
FIG. 10B shows a network configuration according to an implementation of the disclosed subject matter.

FIG. 10B shows an example network arrangement according to an implementation of the disclosed subject matter. One or more clients 10, 11, such as local computers, smart phones, tablet computing devices, and the like may connect to other devices via one or more networks 7. The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15.

More generally, various implementations of the presently disclosed subject matter may include or be implemented in the form of computer-implemented processes and apparatuses for practicing those processes. The disclosed subject matter also may be implemented in the form of a computer program product having computer program code containing instructions implemented in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing implementations of the disclosed subject matter. Implementations also may be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions.

Implementations may use hardware that includes a processor, such as a general-purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A computer-implemented method, comprising:
   determining a first ambient light value based on a first amount of light detected by an ambient light sensor;

illuminating a light source integrated into a device with the ambient light sensor;

determining a second ambient light value based on a second amount of light detected by the ambient light sensor when the light source is illuminated at an intensity;

computing an offset value representing a difference between the first ambient light value and the second ambient light value;

detecting a motion;

computing a third ambient light value based on a third amount of light detected by the ambient light sensor and the offset value; and determining an illumination level of the light source based on the third ambient light value and the motion.

2. The method of claim 1, wherein the offset value is dynamically adjusted based on data generated by the ambient light sensor over a period of time.

3. The method of claim 1, wherein the first ambient light value and the second ambient light value are determined in a dark environment.

4. The method of claim 3, wherein the dark environment comprises an ambient light intensity of not more than 60 lux.

5. The method of claim 1, wherein the intensity of the light source is not more than 150 lux.

6. The method of claim 1, wherein the intensity of the light source is not more than 500 lux.

7. The method of claim 1, wherein the intensity of the light source is in a range from 125 lux to 550 lux inclusive.

8. The method of claim 1, wherein the device comprises a single device.

9. The method of claim 1, further comprising determining the illumination level of the light source based on a time of day.

10. The method of claim 1, wherein the motion is detected within a field of view of a different device and not within the field of view of the device that contains the light source and the ambient light sensor.

11. The method of claim 1, further comprising transmitting, from the device, a signal indicating the motion.

12. A path light device, comprising:
an ambient light sensor;
a light source;
a processor communicatively coupled to the light source and the ambient light sensor, the processor configured to:
determine a first ambient light value based on a first amount of light detected by the ambient light sensor;
illuminating the light source;
determine a second ambient light value based on a second amount of light detected by the ambient light sensor when the light source is illuminated at an intensity;
compute an offset value representing a difference between the first ambient light value and the second ambient light value;
detect a motion;
compute a third ambient light value based on a third amount of light detected by the ambient light sensor and the offset value; and
determine an illumination level of the light source based on the third ambient light value and the motion.

13. The path light device of claim 12, wherein the offset value is dynamically adjusted based on data generated by the ambient light sensor over a period of time.

14. The path light device of claim 12, wherein the first ambient light value and the second ambient light value are determined in a dark environment.

15. The path light device of claim 14, wherein the dark environment comprises an ambient light intensity of not more than 60 lux.

16. The path light device of claim 12, wherein the intensity of the light source is not more than 150 lux.

17. The path light device of claim 12, wherein the intensity of the light source is not more than 500 lux.

18. The path light device of claim 12, wherein the intensity of the light source is in a range from 125 lux to 550 lux inclusive.

19. The path light device of claim 12, the processor further configured to determine the illumination level of the light source based on a time of day.

20. The path light device of claim 12, wherein the processor is configured to detect the motion within a field of view of a different device and not within the field of view of the path light device.

21. The system of claim 12, the processor further configured to transmit, from the path light device, a signal indicating the motion.

22. A computer-implemented method, comprising:
obtaining an offset value for a path light corresponding to a difference between a first amount of light detected by an ambient light sensor of the path light when a light source of the path light is illuminated at an intensity and a second amount of light detected by the ambient light sensor when the light source is inactive;
receiving, by the path light, an activation signal;
activating the light source at the intensity;
detecting a third amount of light by the ambient light sensor;
subtracting the offset value from the third amount of light to produce an adjusted light level; and
determining if the adjusted light level is below a threshold.

23. The method of claim 22, further comprising illuminating the light source of the path light in response to a determination that the adjusted light level is below the threshold.

24. A computer-implemented method, comprising:
determining a first offset value for a path light corresponding to a difference between a first amount of light detected by an ambient light sensor of the path light when a light source of the path light is illuminated at an intensity and a second amount of light detected by the ambient light sensor when the light source is inactive;
determining a first environmental light amount by the ambient light sensor;
applying the first offset value to the environmental light amount;
receiving a re-test signal;
responsive to the re-test signal, determining a second offset value for the path light corresponding to a difference between a third amount of light detected by the ambient light sensor of the path light when the light source of the path light is illuminated at the intensity and a fourth amount of light detected by the ambient light sensor when the light source is inactive;
determining a second environmental light amount by the ambient light sensor; and
applying the second offset value to the second environmental light amount.

25. The method of claim 24, further comprising:
determining that the second environmental light amount is below a threshold; and
illuminating the light source of the path light in response to a determination that the second environmental light amount is below the threshold.

* * * * *